M. B. LLOYD.
REINFORCED TUBING.
APPLICATION FILED MAR. 10, 1914.
1,141,067.
Patented May 25, 1915.
2 SHEETS—SHEET 1.
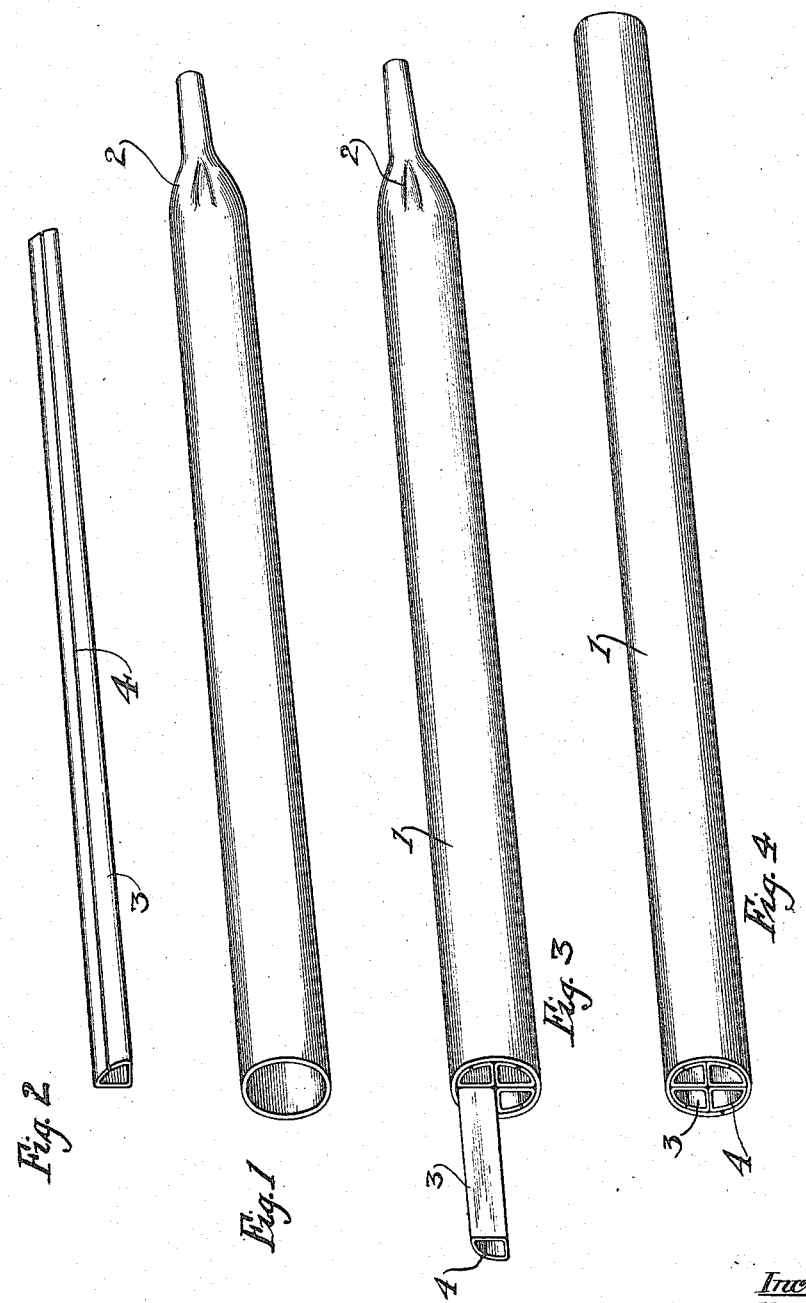

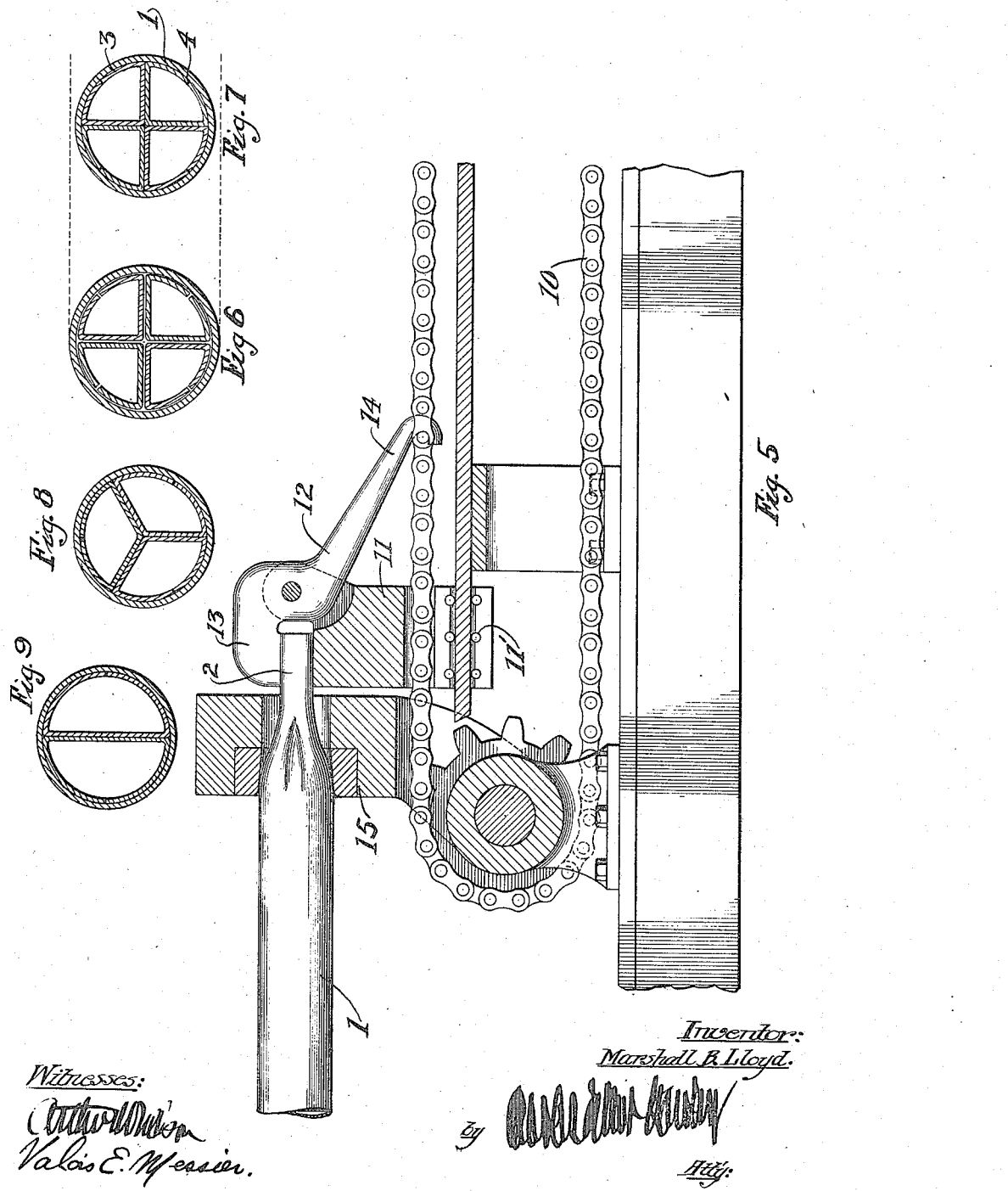

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

REINFORCED TUBING.

1,141,067.　　　　　Specification of Letters Patent.　　Patented May 25, 1915.

Application filed March 10, 1914.　Serial No. 823,788.

*To all whom it may concern:*

Be it known that I, MARSHALL B. LLOYD, a citizen of the United States, and a resident of Menominee, county of Menominee and State of Michigan, have invented certain new and useful Improvements in Reinforced Tubing, of which the following is a specification.

My invention relates generally to the formation of seamless tubing, and has particular reference to reinforced seamless tubing.

The general object of my invention is to provide tubing which shall be adapted to withstand tremendous strains and which at the same time shall be comparatively light in weight, and inexpensive to manufacture.

A further object of my invention is to provide an article of this character which can be made without special skill and by simple and durable mechanism.

To this end my invention consists generally in the novel reinforced tubing hereinafter described and claimed; and will be more readily understood by reference to the accompanying drawings, wherein—

Figure 1 is a perspective view of a commercial length of seamless tube, which is to be reinforced; Fig. 2 is a perspective view of one form of longitudinally seamed tube, which I use as a reinforcing filler for the seamless tube; Fig. 3 is a perspective view illustrating the operation of placing the seamed filled tubes within the seamless tube or casing; Fig. 4 is a perspective view illustrating the finished product; Fig. 5 is a detail view illustrating mechanism for acting upon the seamless tube after the fillers have been placed therein and whereby the seamless tube is caused compressively to grip the fillers; Fig. 6 is a cross sectional view showing the relation and condition of the parts before being acted upon by the mechanism shown in Fig. 5; Fig. 7 is a view indicating the relation and condition of the parts after being acted upon by the mechanism shown in Fig. 5; and Figs. 8 and 9 are cross-sectional views illustrating modified forms of my invention.

Tubing is adapted for use in a great many industries, because with modern processes of manufacture it can be made at low cost; it can be made so that the product is of uniform strength and pleasing appearance; and it is capable of withstanding considerable stress and strain, and other forces tending to distort it. There are, however, many industries where it has hitherto been practically impossible to use tubing, either because the tubing was incapable of withstanding the forces to which it would be subjected, or if capable of use for that reason was prohibited because of weight, cost of manufacture, or similar factors.

I have devised a novel way whereby seamless tubing can be reinforced so that it is capable of withstanding tremendous strain and forces tending to distort it, which at the same time is comparatively light in weight, and which can be manufactured rapidly and at little expense, thereby adapting tubing for use in many industries where it has hitherto been necessary to resort to other and more expensive material.

Referring to the drawings, 1 represents a commercial length of seamless tubing which may be made by any of the well known processes. The piece indicated is made by the drawing method and 2 represents the crushed end where the tubing was gripped in being drawn through the reducing die or dies to secure the proper cross-sectional size.

3 represents a somewhat smaller tube of substantially the same length and instead of being a seamless tube has a longitudinal seam 4. Tubing of this kind can be made rapidly and economically from strip metal by simply passing the strip metal through a number of shaping or forming rolls or dies. The tube 3 may assume various shapes and sizes, but it is always of such shape and size that it can be freely placed within the seamless tube 1. For most purposes I prefer to place a number of the filler tubes within the seamless tube and when so placed they appear substantially as indicated in Fig. 6, that is to say, they substantially fill the seamless tube. After the filler tubes are placed within the seamless tube, I next act upon the seamless tube to draw it down whereby it is caused compressively to grip the filler tubes and to close the respective seams 4 thereof. For this purpose any suitable mechanism may be provided such for example as shown in Fig. 5. Therein 10 represents an endless chain operating over suitable sprockets and which is driven by a suitable source of power not shown. 11 represents a draw head, longitudinally slidable on the roller bearings 11', which carries a pivoted member 12 having a jaw portion 13 and an arm portion 14. The arm may be placed to engage a link or pin of the sprocket chain 10 so that movement thereof causes longitudinal movement of the head. 15 represents a reducing die or tool where the tubing 1 with its contained fillers is to be drawn down. The first movement of the chain 10 causes the jaw portion 13 of the head 11 to grip the end 2 of the tube and then as the head is moved the tube is drawn through the reducing die, and as the tube emerges it appears somewhat reduced, substantially as indicated in Fig. 7. Of course, it will be understood that Fig. 7 is simply illustrative and that the actual reduction of the parts need not be as great as there indicated. The tube is also somewhat elongated by this reducing action, as is indicated in Fig. 4. After the reducing step I usually trim off the crushed end of the tube as is also shown in Fig. 4. The resulting tube is extremely rigid since it is braced throughout its whole circumference and transversely across two of its diameters. It constitutes an article adapted to a wide range of work in which it has hitherto been necessary to use other and more expensive construction. By using seamed inner tubes which can be rapidly and cheaply made, the cost of manufacture is comparatively little more than that of the unreinforced seamless tube.

For some classes of work it is advantageous to form the fillers as indicated in Figs. 8 and 9.

It will be seen, therefore, that in all forms of my invention I have retained the characteristic of the seamed filler tube within the seamless outer tube, so that all forms of my invention may be manufactured rapidly and at low cost.

The term seamless tube as herein used is intended to include, seamless, brazed, welded, or tubes otherwise formed, so that the finished product is endless in cross section.

From this description the objects and advantages of my invention will be apparent to those skilled in the art to which this appertains.

I claim:

As an article of manufacture, a reinforced tube comprising an outer seamless tube and a plurality of abutting longitudinally seamed filler tubes compressively gripped by said outer tube.

In testimony whereof, I have hereunto set my hand, this 20th day of January, 1914, in the presence of two subscribing witnesses.

MARSHALL BURNS LLOYD.

Witnesses:
CHARLES GILBERT HAWLEY,
ARTHUR W. NELSON.